United States Patent
Kumar et al.

(10) Patent No.: US 11,521,203 B2
(45) Date of Patent: Dec. 6, 2022

(54) GENERATING A CRYPTOGRAPHIC KEY BASED ON TRANSACTION DATA OF MOBILE PAYMENTS

(71) Applicant: Cryptography Research, Inc., Sunnyvale, CA (US)

(72) Inventors: Ambuj Kumar, Sunnyvale, CA (US); Philippe Martineau, Saint Paul Lez Durance (FR); William Craig Rawlings, Saratoga, CA (US); Helena Handschuh, Palo Alto, CA (US)

(73) Assignee: CRYPTOGRAPHY RESEARCH, INC., San Jose, CA (US)

( * ) Notice: Subject to any disclaimer, the term of this patent is extended or adjusted under 35 U.S.C. 154(b) by 1251 days.

(21) Appl. No.: 15/203,722

(22) Filed: Jul. 6, 2016

(65) Prior Publication Data
US 2017/0011394 A1    Jan. 12, 2017

Related U.S. Application Data

(60) Provisional application No. 62/190,536, filed on Jul. 9, 2015.

(51) Int. Cl.
| | | |
|---|---|---|
| *G06Q 20/38* | (2012.01) | |
| *G06Q 20/32* | (2012.01) | |
| *G06Q 20/40* | (2012.01) | |

(52) U.S. Cl.
CPC ..... *G06Q 20/3829* (2013.01); *G06Q 20/3227* (2013.01); *G06Q 20/401* (2013.01); *G06Q 2220/00* (2013.01); *H04L 2209/56* (2013.01)

(58) Field of Classification Search
None
See application file for complete search history.

(56) References Cited

U.S. PATENT DOCUMENTS

| | | | | |
|---|---|---|---|---|
| 6,304,658 B1 * | 10/2001 | Kocher | ................... | G06F 7/723 380/28 |
| 7,318,050 B1 * | 1/2008 | Musgrave | .............. | G06Q 20/40 235/379 |
| 7,994,915 B2 * | 8/2011 | Sato | .................. | G06K 19/07762 713/169 |

(Continued)

FOREIGN PATENT DOCUMENTS

AU       2014391256 A1 *  7/2016  ............. G06F 21/46

OTHER PUBLICATIONS

Review on Network Security and Cryptography. https://patents.google.com/scholar/13727596446903640697?q=generation+of+multiple+keys+and+cryptogram+to+secure+trasnaction&q=transaction&patents=false&scholar&page=1 (Year: 2015).*

(Continued)

*Primary Examiner* — El Mehdi Oussir
(74) *Attorney, Agent, or Firm* — Lowenstein Sandler LLP

(57) ABSTRACT

A base key that is stored at a mobile device may be received. A first dynamic key that is based on the base key may be generated. First transaction data corresponding to a first transaction associated with the mobile device may be received. Furthermore, the first dynamic key may be updated to generate a second dynamic key based on a combination of the first dynamic key and the first transaction data corresponding to the first transaction. Authentication of a second transaction associated with the mobile device may be requested based on the second dynamic key.

18 Claims, 15 Drawing Sheets

(56) References Cited

U.S. PATENT DOCUMENTS

| | | | |
|---|---|---|---|
| 8,190,895 B2 | 5/2012 | Lauter et al. | |
| 9,767,319 B2* | 9/2017 | Chen | H04L 63/0838 |
| 11,086,980 B2* | 8/2021 | Le Saint | H04L 9/321 |
| 2002/0023217 A1* | 2/2002 | Wheeler | G06Q 20/02 |
| | | | 713/171 |
| 2003/0145203 A1* | 7/2003 | Audebert | G06Q 20/341 |
| | | | 713/169 |
| 2004/0030901 A1* | 2/2004 | Wheeler | G06Q 20/382 |
| | | | 713/176 |
| 2010/0241507 A1* | 9/2010 | Quinn | G06Q 30/0244 |
| | | | 705/14.42 |
| 2013/0185167 A1* | 7/2013 | Mestre | G06Q 20/202 |
| | | | 705/21 |
| 2013/0301828 A1 | 11/2013 | Gouget et al. | |
| 2014/0108263 A1* | 4/2014 | Ortiz | G06Q 20/36 |
| | | | 705/44 |
| 2014/0310182 A1* | 10/2014 | Cummins | G06Q 20/4012 |
| | | | 705/71 |
| 2015/0019443 A1* | 1/2015 | Sheets | G06Q 20/3278 |
| | | | 705/71 |
| 2015/0156176 A1* | 6/2015 | Collinge | H04W 12/041 |
| | | | 713/168 |
| 2015/0178724 A1* | 6/2015 | Ngo | H04L 9/0869 |
| | | | 705/71 |
| 2015/0180836 A1* | 6/2015 | Wong | G06Q 20/322 |
| | | | 713/172 |
| 2016/0019536 A1* | 1/2016 | Ortiz | G06Q 20/36 |
| | | | 705/67 |
| 2016/0057619 A1* | 2/2016 | Lopez | H04W 12/041 |
| | | | 380/247 |
| 2016/0140545 A1* | 5/2016 | Flurscheim | G06Q 20/3821 |
| | | | 705/76 |
| 2018/0189783 A1* | 7/2018 | Flurscheim | G06Q 20/326 |
| 2022/0019995 A1* | 1/2022 | Ngo | G06Q 20/385 |

OTHER PUBLICATIONS

Asokan, N. et al., "The State of the Art in Electronic Payment Systems", IEEE Computer, vol. 30, pp. 28-35, 1997. 8 pages.

Tiwari, Ayu et al., "A Multi-Factor Security Protocol for Wireless Payment—Secure Web Authentication Using Mobile Devices", IADIS, International Conference Applied Computing, pp. 160-167, 2007. 8 pages.

Zhang, Xiao, "A Survey of Digital Rights Management Technologies", downloaded from http://www.cse.wustl.edu/~jain/cse571-11/ftp/drm/, last modified Nov. 28, 2011. 10 pages.

* cited by examiner

GENERATING A CRYPTOGRAPHIC KEY BASED ON TRANSACTION DATA OF MOBILE PAYMENTS

RELATED APPLICATION

This application claims the benefit under 35 U.S.C. § 119(e) of U.S. Provisional Application 62/190,536 filed on Jul. 9, 2015, which is hereby incorporated by reference.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
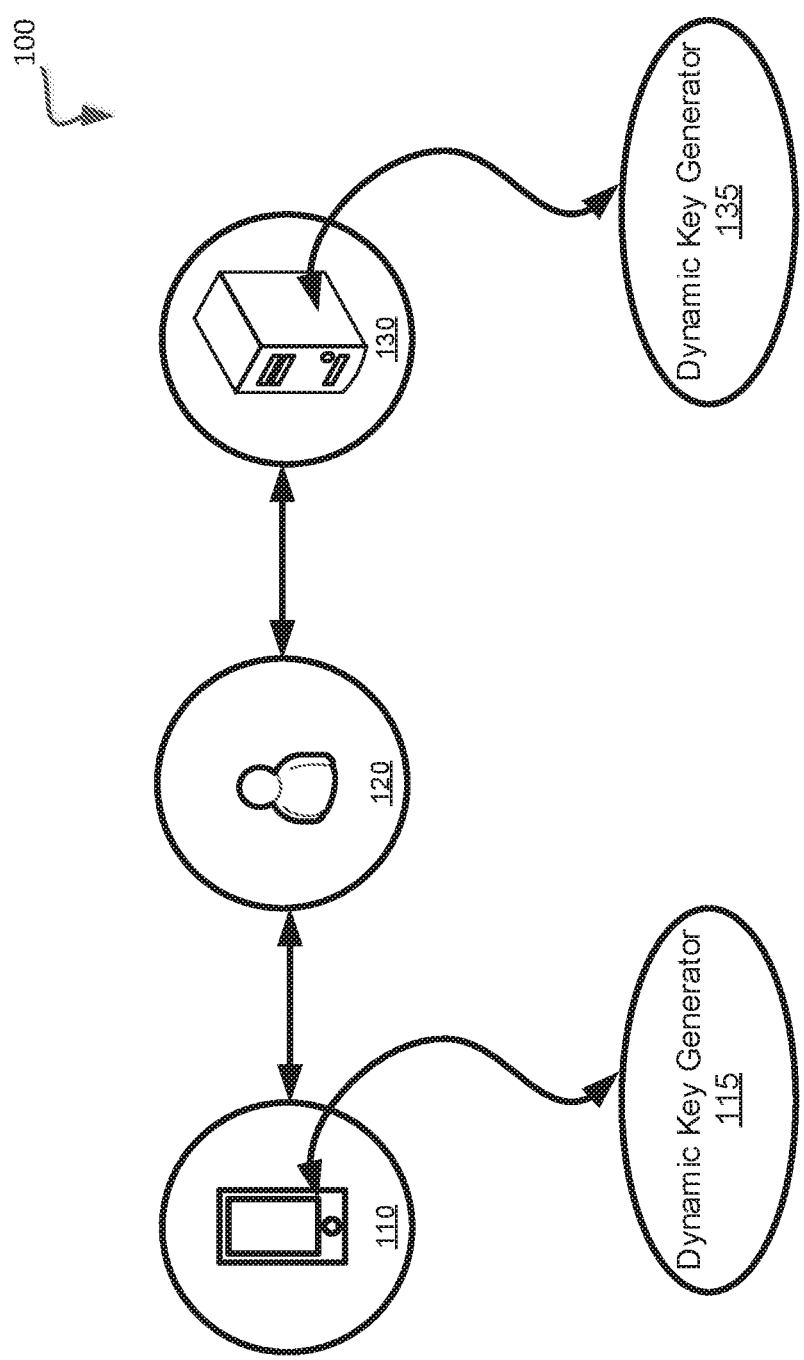
FIG. 1 illustrates an example environment with a device that includes a dynamic key generator in accordance with some embodiments.

Aspects of the present disclosure are directed to cryptographic security for mobile payments. A mobile device (e.g., a smart phone or other such mobile communications device) may be used to conduct a transaction between a customer (e.g., a user of the mobile device) and a merchant (e.g., a provider of goods and/or services). For example, the mobile device may be used to provide a mobile payment from the customer to the merchant.

The mobile payment from the customer using the mobile device may be authenticated or authorized by a payment processor. For example, the customer may provide the mobile payment from his or her mobile device to the merchant. Subsequently, the merchant may transmit information corresponding to the mobile payment to the payment processor, which may authenticate or authorize the mobile payment. For example, the payment processor may verify that the customer is authorized to make the mobile payment.

Security for the mobile payments may be provided through the use of cryptographic keys. For example, the payment processor, or another such remote entity, may transmit an ephemeral key to the mobile device. The ephemeral key may be used to generate a cryptogram (e.g., encrypted information) associated with the mobile payment. For example, the mobile payment information may be encrypted or cryptographically signed with the ephemeral key. The mobile device may then transmit the cryptogram to the payment processor that may authenticate or verify the cryptogram by using the previously transmitted ephemeral key.

The payment processor may transmit a new ephemeral key to the mobile device for each mobile payment and/or for various time intervals (e.g., every predefined number of seconds). However, the transmitting of a new ephemeral key to the mobile device may require that the mobile device to be in constant communication with the payment processor. Additionally, a secure communication channel between the mobile device and the payment processor may be needed to transmit the ephemeral key so that an unauthorized entity may not obtain the ephemeral key and make an unauthorized mobile payment.

A base key, or a persistent key, that is stored in the mobile device may be used to provide cryptographic security for the mobile payment. For example, a dynamic key may be derived or generated from the base key. The dynamic key may be updated for each transaction or mobile payment that is conducted by the mobile device. As an example, a first dynamic key may be generated based on the base key. After a first mobile payment is conducted, a first cryptogram may be generated based on the first dynamic key and information that corresponds to the first mobile payment (e.g., a transaction or monetary amount, merchant identification, customer identification, time of payment, etc.). The first cryptogram may then be transmitted from the mobile device to the payment processor via the merchant. In response to receiving the first cryptogram, the payment processor may then verify the first cryptogram by using a copy of the first dynamic key that is generated by the payment processor. For example, the payment processor may also store a copy of the base key that is stored at the mobile device and may generate the first dynamic key from the same base key.

After the first cryptogram has been generated from the first dynamic key, a second dynamic key may be generated by updating the first dynamic key. For example, the second dynamic key may be generated based on a combination of the previous first dynamic key and at least a portion of the information of the first mobile payment. The second dynamic key may then be used to generate a second cryptogram for a second mobile payment that follows the first mobile payment. The second cryptogram may then be transmitted from the mobile device to the payment processor via the merchant and the payment processor may authenticate the mobile payment based on a copy of the second dynamic key that is similarly generated by the payment processor.

Thus, a base key that is stored at the device may be used to provide cryptographic security for mobile payments conducted by a mobile device without requiring the receiving of ephemeral keys from a remote entity (e.g., the payment processor) over a secure communication channel. The base key may be used to generate a dynamic key that is subsequently updated for each transaction or mobile payment that is conducted by the mobile device. The updated dynamic key may then be used to generate a cryptogram that may be transmitted to the payment processor for authentication of the mobile payment. For example, the payment processor may also store the base key and may similarly generate and update the dynamic key in response to receiving cryptograms corresponding to the transactions or mobile payments from the mobile device.

Aspects of the present disclosure may further receive ephemeral keys from the remote entity and the dynamic key may be updated based on the ephemeral keys. Furthermore, the mobile device and the payment processor may maintain a transaction log that may be used to represent mobile payments. As described in further detail below, the transaction log may be used to identify a state (i.e., a checkpoint) where previous mobile payments have been authorized, cancel a previous mobile payment, and so forth.

FIG. 1 illustrates an example environment 100 with a device that includes a dynamic key generator. In general, the environment 100 includes a mobile device 110 that is associated with a customer, a merchant 120, and a payment processor 130.

As shown in FIG. 1, the environment 100 may include a mobile device 110 that includes a dynamic key generator 115. The mobile device 110 may be associated with a customer who purchases a service or a good from the merchant 120 by conducting a transaction such as a mobile payment. The mobile payment may correspond to a use of a credit card or debit card account. The dynamic key generator 115 of the mobile device 110 may generate a cryptogram (i.e., encrypted data) based on a dynamic key and transaction data associated with the mobile payment and may transmit the cryptogram to the merchant 120 over a network. The merchant 120 may subsequently transmit the cryptogram to the payment processor 130 over a network.

The payment processor 130 may authenticate or verify the mobile payment transmitted by the mobile device 110. In some embodiments, the payment processor 130 may also include a dynamic key generator 135 that may generate a dynamic key that is a copy of the dynamic key generated by the dynamic key generator 115 of the mobile device 110. As an example, the payment processor 130 may receive the cryptogram that is generated based on a dynamic key from the dynamic key generator 115. The payment processor 130 may then authenticate a mobile payment associated with the cryptogram by using another dynamic key that is generated from the dynamic key generator 135. Thus, if the dynamic key that is used to generate the cryptogram matches the dynamic key that is generated by the payment processor 130, then the mobile payment corresponding to the cryptogram may be successfully authenticated. However, if the dynamic key that is generated by the payment processor 130 does not match the dynamic key that was used to generate the cryptogram, then the payment processor 130 may not successfully authenticate the mobile payment corresponding to the cryptogram.

Figure 2:
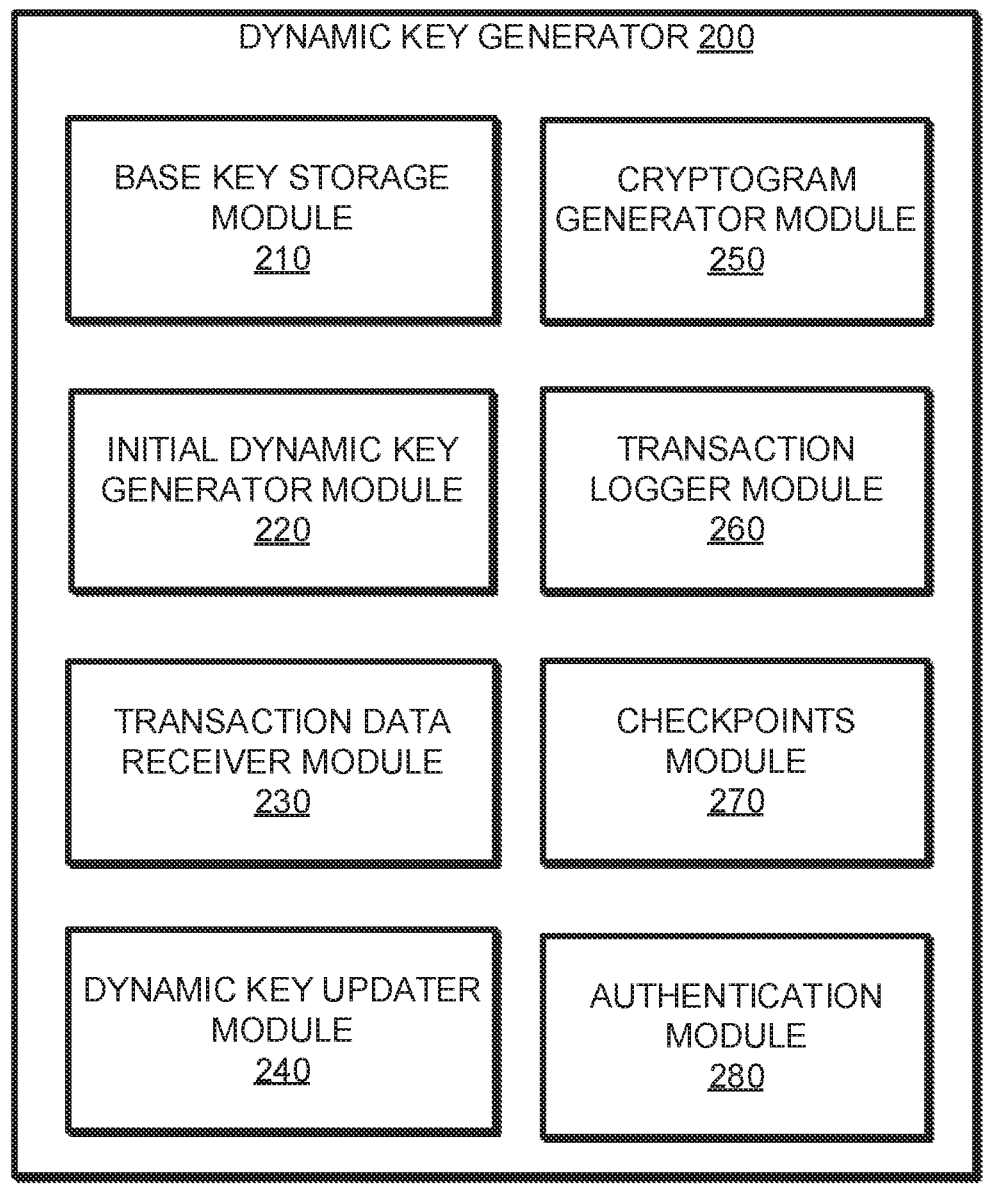
FIG. 2 is a block diagram of an example dynamic key generator in accordance with some embodiments.

FIG. 2 is a block diagram of an example dynamic key generator 200. In general, the dynamic key generator 200 may correspond to the dynamic key generator 115 or 135 of FIG. 1. The dynamic key generator 200 may comprise hardware (e.g., processing device, circuitry, dedicated logic, programmable logic, microcode, hardware of a device, integrated circuit, etc.), software (e.g., instructions run or executed on a processing device), or a combination thereof.

As shown in FIG. 2, the dynamic key generator 200 may include a base key storage module 210 that may store a base key (also referred to as a persistent key). The base key storage module 210 may correspond to a one-time programmable (OTP) memory (e.g., a memory where a bit may be changed from a first value to a second value once), a netlist (e.g., the connectivity of circuit components of an integrated circuit), or any other memory element. The base key storage module 210 may correspond to a hardware root of trust on a mobile device. In some embodiments, the base key storage module 210 may correspond to multiple keysplits (e.g., a first portion and a second portion of the base key are stored in different memory elements). The base key storage module 210 may thus correspond to a memory of a mobile device.

The dynamic key generator 200 may further include an initial dynamic key generator module 220 that may generate a first dynamic key based on the base key and another value. For example, the first dynamic key may be generated based on a combination of the base key and an identification of a mobile payment function being performed by a mobile device that includes the dynamic key generator 200. In the same or alternative embodiments, the first dynamic key may be generated based on a combination of the base key and an identification of a user. In another embodiment, the first dynamic key may be generated based on a combination of the base key and an ephemeral key that is received from a remote entity (e.g., a payment processor).

Referring to FIG. 2, the dynamic key generator 200 may include a transaction data receiver module 230 that may receive mobile payment information. The mobile payment information may include, but is not limited to, an identification of a merchant for the mobile payment, an identification of a good and/or service that is being purchased, an identification of the customer of the mobile device conducting the mobile payment, an amount of the mobile payment, and a time that the mobile payment was created. The dynamic key updater module 240 may update the first dynamic key that was generated by the initial dynamic key generator module 220. For example, the first dynamic key may be updated to generate a second dynamic key based on a combination of the first dynamic key and transaction data corresponding to a first mobile payment. The updating of the dynamic key may also be referred to as rolling the dynamic key.

The dynamic key generator 200 may further include a cryptogram generator module 250 that may generate a cryptogram based on a combination of a dynamic key and transaction data (e.g., mobile payment information). For example, for each mobile payment, a cryptogram may be generated based on at least a portion of the mobile payment information and a dynamic key. As an example, for a first mobile payment, a first cryptogram may be generated based on the first dynamic key and at least a portion of the first mobile payment information. After the conducting of the first mobile payment, the first dynamic key may be updated to generate a second dynamic key. For a second mobile payment (e.g., a subsequent mobile payment), a second cryptogram may be generated based on a combination of the second dynamic key and at least a portion of the second mobile payment information. In some embodiments, the cryptograms may be a cryptographic proof generated from a cryptographic operation between the corresponding dynamic key and the corresponding mobile payment information. Examples of the cryptographic operation include, but are not limited to, Advanced Encryption Standard (AES), Triple Data Encryption Algorithm (TDEA or TDES), Elliptic Curve Cryptography (ECC), a hash function, a keyed-hash message authentication code (HMAC), or any other cryptographic operation.

The transaction logger module 260 may create a transaction log or a record of mobile payments that have been conducted by the mobile device. Furthermore, the checkpoints module 270 may create checkpoints for the mobile payments in the transaction log that may be used to cancel or authenticate one or more of the mobile payments. Further details with regard to the maintaining of a transaction log and the use of checkpoints are described in relation to FIGS. 9-11.

The dynamic key generator 200 may further include an authentication module 280 that may be used to request authentication of a transaction. For example, a device may request authentication of a mobile payment that has been conducted by the device by using a cryptogram generated by the cryptogram generator 250. The device may request authentication by transmitting a cryptogram to a payment processor.

Figure 3:
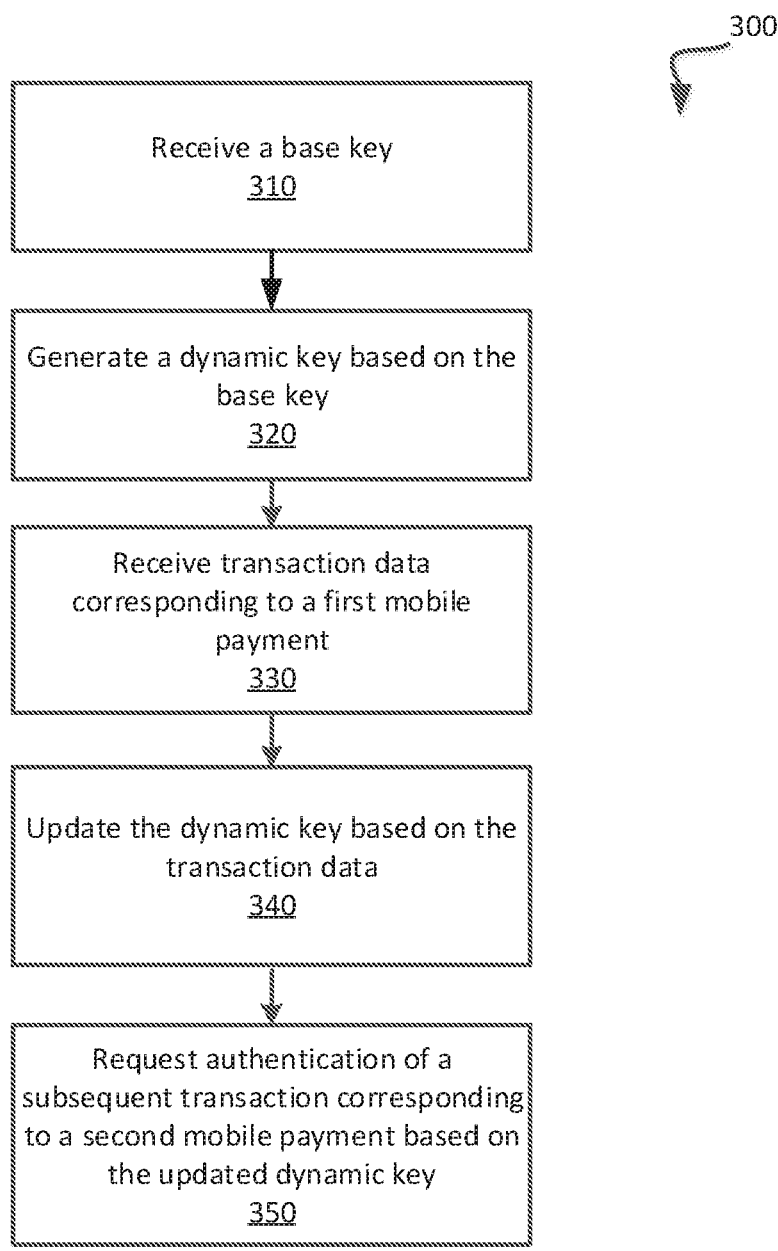
FIG. 3 is a flow diagram of an example method to request authentication of a mobile payment with an updated dynamic key in accordance with some embodiments of the present disclosure.

FIG. 3 is a flow diagram of an example method 300 to request authentication of a mobile payment with an updated dynamic key. In general, the method 300 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 may be performed by the dynamic key generator 115, 135, or 200 of FIG. 1 or 2.

As shown in FIG. 3, the method 300 may begin with the processing logic receiving a base key (block 310). For example, the base key may be retrieved from a memory of a mobile device. The processing logic may further generate a dynamic key based on the base key (block 320). For example, a first dynamic key may be generated from a combination of the base key and another value (e.g., an identification of a mobile payment function, user identification, an ephemeral key, etc.). The first dynamic key may be generated for use with a first mobile payment. The processing logic may receive transaction data corresponding to a first mobile payment (block 330). Furthermore, the processing logic may update the dynamic key based on the transaction data (block 340). For example, the dynamic key may be updated to generate a second dynamic key based on a combination of the previous dynamic key and at least a portion of the transaction data. Subsequently, the processing logic may request authentication of a subsequent transaction corresponding to a second mobile payment based on the updated dynamic key (block 350). For example, the second dynamic key that is generated by the updating of the previous dynamic key with at least a portion of the transaction data of the previous mobile payment may be used to authenticate the second mobile payment.

In some embodiments, the second mobile payment may be authenticated based on a cryptogram that is generated from a combination of the second dynamic key and a portion of transaction data corresponding to the second mobile payment. For example, the generated cryptogram may be transmitted to a payment processor which may verify the cryptogram based on another dynamic key that is updated by the payment processor (e.g., a dynamic key generator 135 of the payment processor 130). In some embodiments, the payment processor may update the dynamic key based on transaction data and a previous dynamic key as described with relation to the dynamic key generator 115. If the dynamic key that is updated by the payment processor matches the dynamic key that was updated by the mobile device and used to generate the cryptogram, then the cryptogram from the mobile device may be successfully authenticated by the payment processor. However, if the dynamic key that is updated by the payment processor does not match the dynamic key that was updated by the mobile device, then the cryptogram from the mobile device may not be successfully authenticated by the payment processor.

Figure 4:
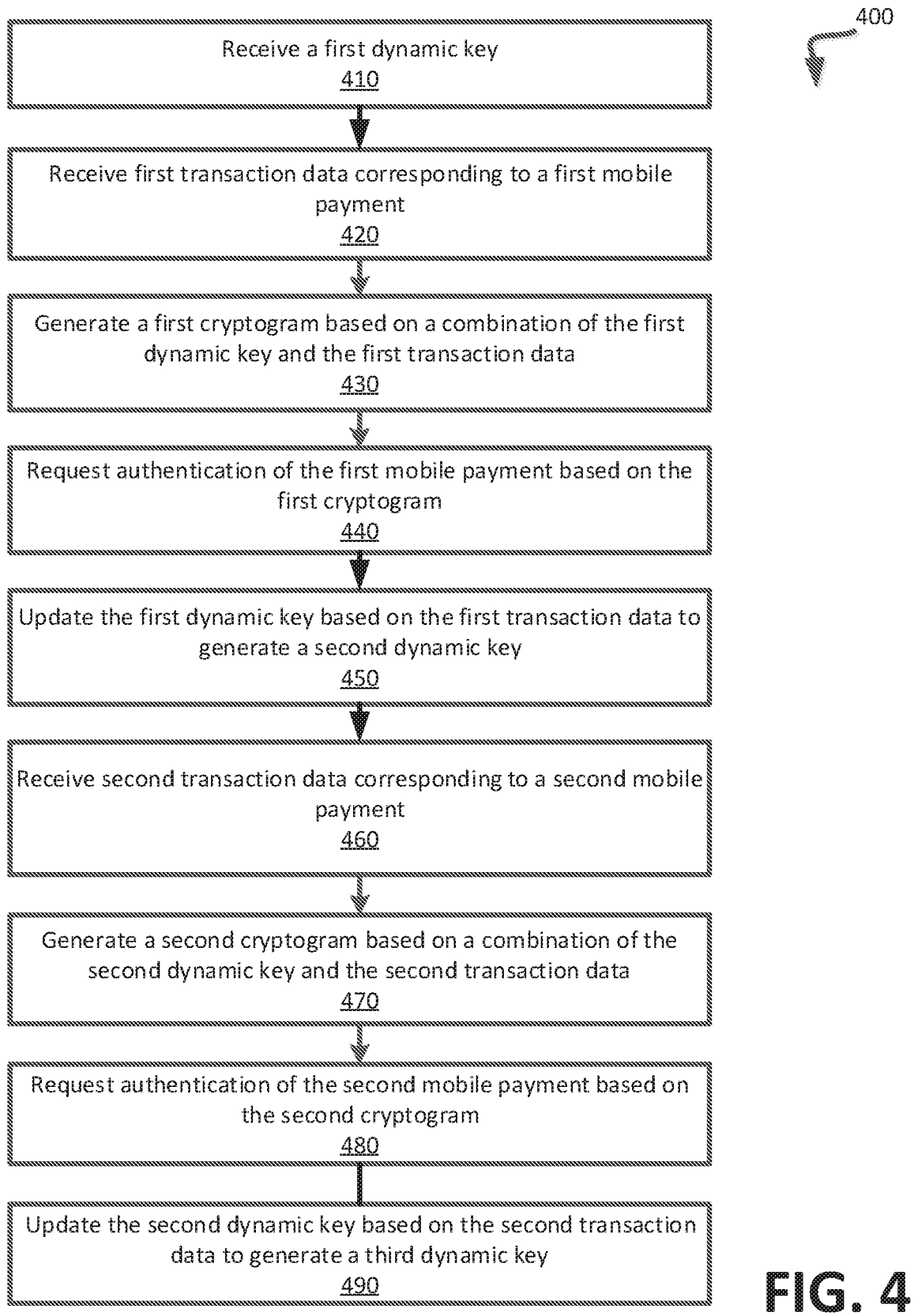
FIG. 4 is a flow diagram of an example method to update a dynamic key in accordance with some embodiments of the present disclosure.

FIG. 4 is a flow diagram of an example method 400 to update a dynamic key. In general, the method 400 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 may be performed by the dynamic key generator 115 or 200 of FIG. 1 or 2.

As shown in FIG. 4, the method 400 may begin with the processing logic receiving a first dynamic key (block 410). The processing logic may further receive first transaction data corresponding to a first mobile payment (block 420). Subsequently, the processing logic may generate a first cryptogram based on a combination of the first dynamic key and the first transaction data (block 430) and may request authentication of the first mobile payment based on the first cryptogram (block 440). For example, the first cryptogram may be generated based on a cryptographic operation between the first dynamic key and the first transaction data and the authentication of the first mobile payment may be based on an authentication or a verification of the first cryptogram. The first cryptogram may be transmitted to a payment processor and authenticated or verified by the payment processor.

The processing logic may subsequently update the first dynamic key based on the first transaction data to generate a second dynamic key (block 450). For example, the second dynamic key may be based on a combination between the first dynamic key and the first transaction data of the first mobile payment. The updating of the first dynamic key to generate the second dynamic key may be referred to as rolling a dynamic key. The processing logic may then receive second transaction data corresponding to a second mobile payment (block 460). For example, the second transaction data and the second mobile payment may be received after the first transaction data and the first mobile payment has been received. The processing logic may subsequently generate a second cryptogram based on a combination of the second dynamic key and the second transaction data of the second mobile payment (block 470) and may request authentication of the second mobile payment based on the second cryptogram (block 480). For example, the second cryptogram may be transmitted from a mobile device to a payment processor for verification of the second mobile payment. After the receiving of the second transaction data, the processing logic may update the second dynamic key based on the second transaction data to generate a third dynamic key (block 490). The third dynamic key may be used to generate a subsequent cryptogram for a subsequent mobile payment that is conducted after the second mobile payment.

Thus, a mobile payment may be authenticated based on a cryptogram that is generated from a dynamic key that was used to generate a previous cryptogram from a previous mobile payment and transaction data of the previous mobile payment.

Figure 5:
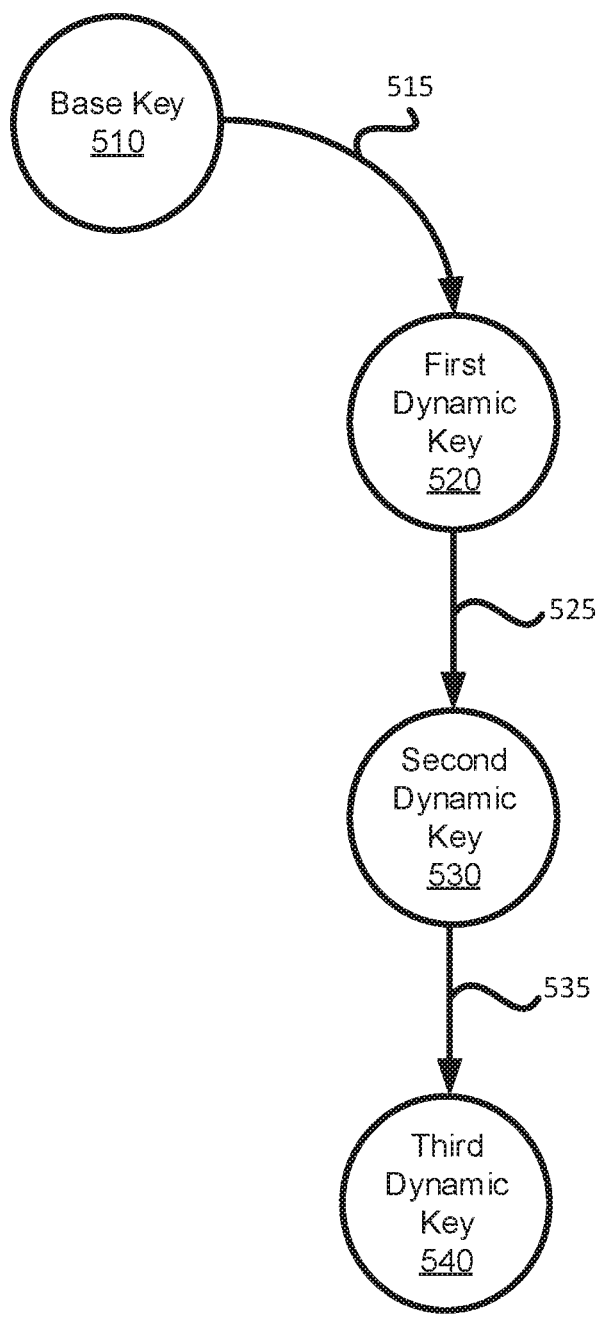
FIG. 5 illustrates the generating of dynamic keys based on the updating of another dynamic key in accordance with some embodiments.

FIG. 5 illustrates the generating of dynamic keys based on the updating of another dynamic key. In general, the updating of a dynamic key may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the updating of a dynamic key may be performed by the dynamic key generator 115, 135, or 200 of FIG. 1 or 2.

As shown in FIG. 5, a base key 510 may be retrieved (e.g., from OTP memory of a mobile device) and may be combined with another input value 515 (e.g., a value corresponding to a mobile payment function and/or a user identification). The first dynamic key 520 may thus be generated based on a combination of the base key 510 and the other input value 515. The first dynamic key 520 may be combined with first transaction data 525 to generate a first cryptogram. For example, the first transaction data 525 may correspond to a first mobile payment that has been conducted by a mobile device. After the generation of the first cryptogram, the first dynamic key 520 may be updated based on the first transaction data 525 to generate a second dynamic key 530. Furthermore, the second dynamic key may be combined with second transaction data 535 corresponding to a second mobile payment to generate a second cryptogram that is used to authenticate the second mobile payment. Similarly, the second dynamic key 530 may be updated based on the third transaction data 535 to generate the third dynamic key 540 that may be used to generate a third cryptogram that may be used to authenticate the third mobile payment.

Figure 6:
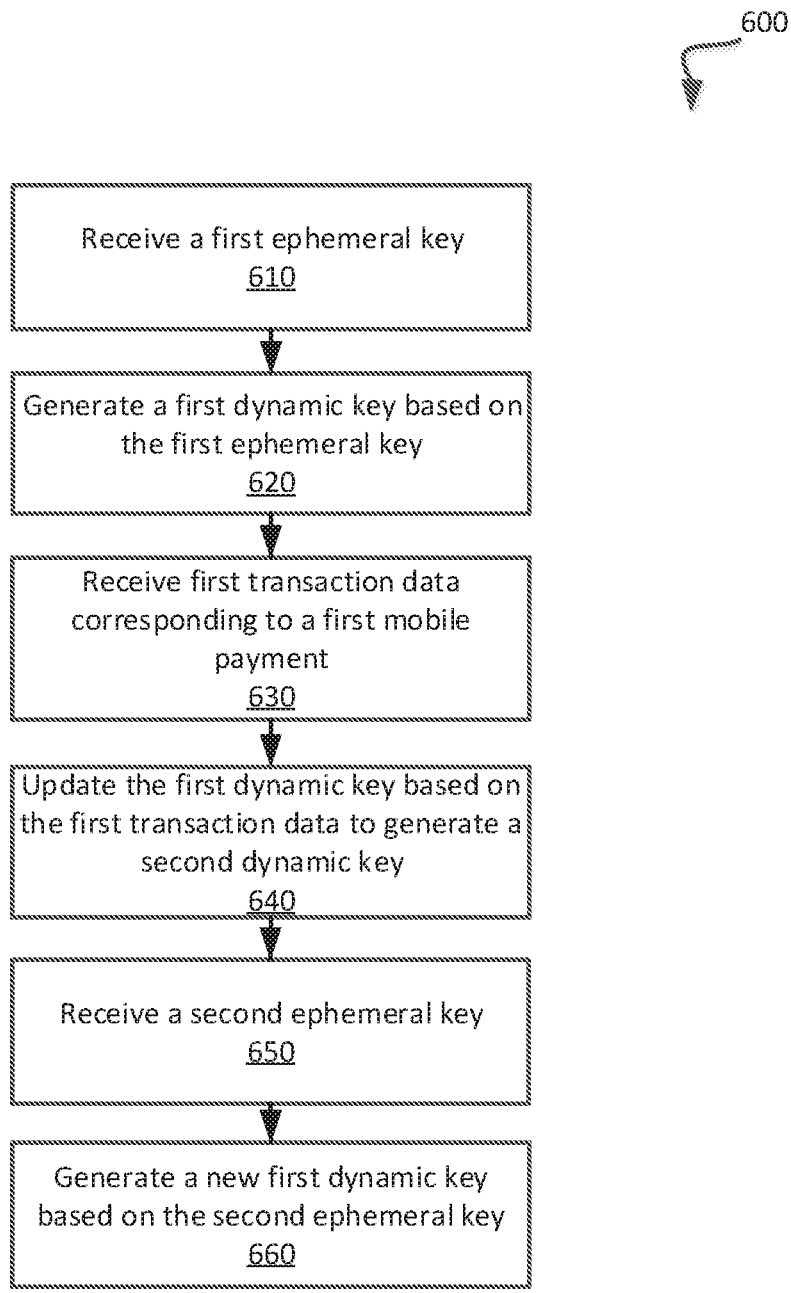
FIG. 6 is a flow diagram of an example method to generate a dynamic key based on an ephemeral key in accordance with some embodiments.

FIG. 6 is a flow diagram of an example method 600 to generate a dynamic key based on an ephemeral key. In general, the method 600 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the updating of a dynamic key may be performed by the dynamic key generator 115, 135, or 200 of FIG. 1 or 2.

As shown in FIG. 6, the method 600 may begin with the processing logic receiving a first ephemeral key (block 610). For example, a mobile device may receive the first ephemeral key from a remote entity (e.g., a server) corresponding to a payment processor. In some embodiments, an ephemeral key may refer to a key that is periodically transmitted to a mobile device from the payment processor. For example, a new ephemeral key may be transmitted to the mobile device after a defined period of time. In alternative embodiments, a new ephemeral key may be transmitted to the mobile device each time that the mobile device conducts a transaction corresponding to a mobile payment. In some embodiments, a new ephemeral key may be transmitted to the mobile device after the conducting of a threshold number of transactions corresponding to mobile payments. The processing logic may generate a first dynamic key based on the first ephemeral key (block 620). For example, a first dynamic key may be generated based on a combination of the first ephemeral key and a base key stored at the mobile device. For example, the first dynamic key may be based on a cryptographic operation between the ephemeral key and the base key. In another embodiment, the ephemeral key may be transmitted from the payment processor to the mobile device while encrypted and the base key stored at the mobile device may be used to decrypt the encrypted ephemeral key to retrieve the ephemeral key for use in generating the first dynamic key. Subsequently, the processing logic may receive first transaction data corresponding to a first mobile payment (block 630) and the first dynamic key may be updated based on the first transaction data to generate a second dynamic key (block 640). For example, the first dynamic key that is generated based on the first ephemeral key received from the payment processor may be updated based on the first transaction data to generate a second dynamic key. The updating of the second dynamic key may continue for subsequent transaction data for subsequent mobile payments.

Referring to FIG. 6, the processing logic may receive a second ephemeral key (block 650). For example, the mobile device may receive a second ephemeral key from the payment processor after receiving the first ephemeral key from the payment processor. In response to receiving the second ephemeral key, the processing logic may generate a new first dynamic key based on the second ephemeral key (block 660). For example, the new first dynamic key may not be based on the updating of a previous dynamic key. The new first dynamic key may then be used to authenticate a subsequent mobile payment conducted after the receiving of the second ephemeral key and the new first dynamic key may be updated based on transaction data of the subsequent mobile payment.

As such, a first ephemeral key may be received and dynamic keys may be generated based on the transaction data of mobile payments conducted after receiving the first ephemeral key. Upon the receiving of a second ephemeral key, new dynamic keys may be generated based on the transaction data of mobile payments conducted after receiving the second ephemeral key.

Figure 7:
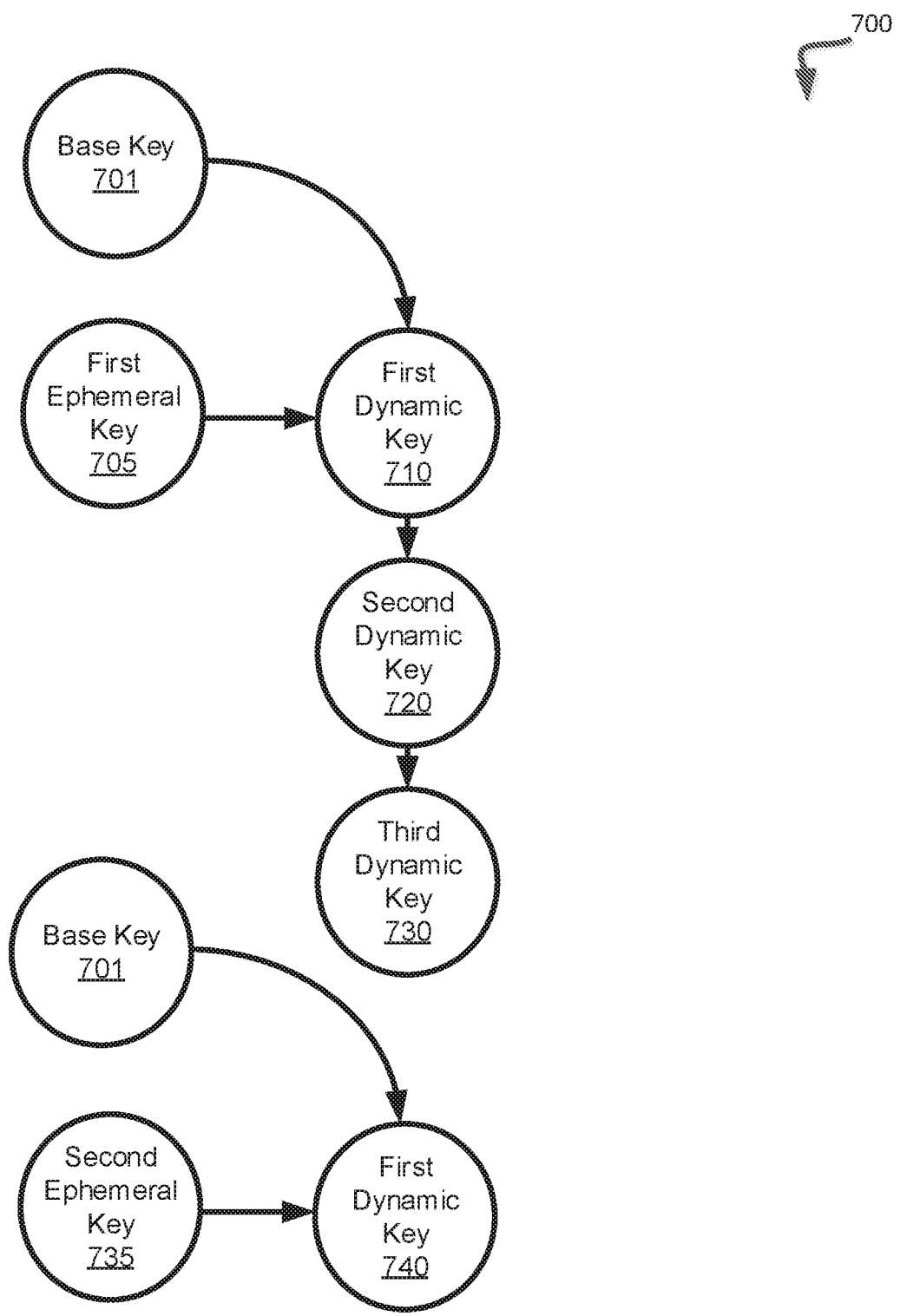
FIG. 7 illustrates the generating of dynamic keys based on ephemeral keys in accordance with some embodiments.

FIG. 7 illustrates the generating of dynamic keys based on ephemeral keys. In general, the generating of a dynamic key may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the generating of a dynamic key may be performed by the dynamic key generator 115, 135, or 200 of FIG. 1 or 2.

As shown in FIG. 7, a first dynamic key 710 of a first series of dynamic keys may be generated based on a combination of a first ephemeral key 705 that is received from a payment processor and a base key 701 that is stored at the mobile device. For example, the base key 701 may be used to decrypt an encrypted first ephemeral key 705 or may be used in a cryptographic operation with the first ephemeral key 705 to generate the first dynamic key 710. Subsequently, the first dynamic key 710 may be updated based on first transaction data corresponding to a first mobile payment to generate the second dynamic key 720 of the first series of dynamic keys. As previously described, the dynamic key may continue to be updated based on subsequent transaction data of subsequent mobile payments until another ephemeral key is received from the payment processor. For example, a third dynamic key 730 may be generated based on updating the second dynamic key with second transaction data of a second mobile payment. Each of the dynamic keys 710, 720, and 730 may be used to generate a separate cryptogram that may be used to authenticate the corresponding mobile payment as previously described.

In response to receiving a second ephemeral key 735 from the payment processor, the first series of dynamic keys may end and a second series of dynamic keys may be generated. For example, the first dynamic key 740 of a second series of dynamic keys may then be generated based on the second ephemeral key 735 and the base key 701. Thus, the second series of dynamic keys may not be updated based on the last dynamic key (e.g., the third dynamic key 730) of the first series of dynamic keys. Furthermore, the first dynamic key of each of the first and second series of dynamic keys may be generated based on the corresponding ephemeral key that is received and the same base key that is stored at the mobile device. For example, the first dynamic key of a first series of dynamic keys may be generated based on a combination of the first ephemeral key and the base key or by decrypting the encrypted first ephemeral key with the base key and the second dynamic key of a second series of dynamic keys may be generated based on a combination of the second ephemeral key and the same base key that was used to generate the first dynamic key of the first series or by decrypting the encrypted second ephemeral key with the same base key that was used to decrypt the first encrypted ephemeral key.

Figure 8:
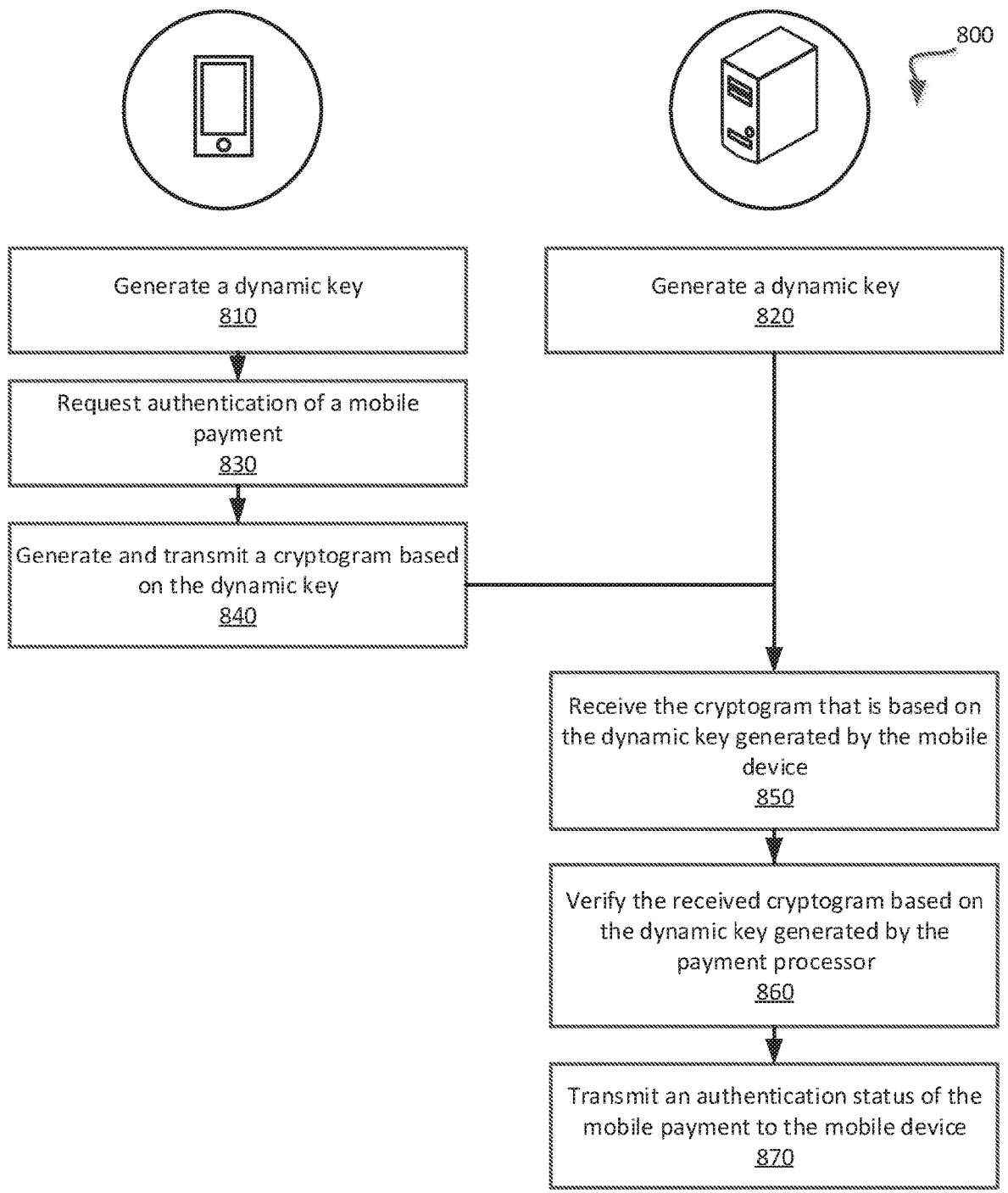
FIG. 8 illustrates an interaction between a mobile device and a payment processor to authenticate a mobile payment in accordance with some embodiments of the present disclosure.

FIG. 8 illustrates an interaction between a mobile device and a payment processor to authenticate a mobile payment. In general, the interaction includes operations that may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the interaction 800 may include operations performed by the dynamic key generator 115 and the dynamic key generator 135 or dynamic key generator 200 of FIG. 1 or 2.

As shown in FIG. 8, the interaction may begin with a mobile device (e.g., mobile device 110) generating a dynamic key (block 810). Similarly, the payment processor (e.g., payment processor 130) may similarly generate a dynamic key (block 820). For example, as previously described, a dynamic key may be generated based on a base key and transaction data. The base key may be stored at the mobile device as well as stored at the payment processor. Thus, dynamic keys may be generated by each of the mobile device and the payment processor based on the same base key. Subsequently, the mobile device may request authentication of a mobile payment (block 830) and generate and transmit a cryptogram based on the dynamic key (block 840). The payment processor may receive the cryptogram from the mobile device (block 850) and may verify the received cryptogram based on the dynamic key generated by the payment processor (block 860). The payment processor may then transmit an authentication status of the mobile payment to the mobile device (block 870). For example, if the cryptogram received from the mobile device was successfully verified by the dynamic key generated by the payment processor, then the mobile payment may be successfully authenticated. However, if the cryptogram received from the mobile device was not successfully verified by the dynamic key that was generated by the payment processor, then the mobile payment not be successfully authenticated.

As such, a payment processor and a mobile device may each generate a dynamic key based on transaction data and a base key. The mobile device may generate a cryptogram based on a dynamic key and transaction data of a mobile payment to request authentication of the mobile payment. If the dynamic key that was generated by the payment processor matches the dynamic key that was generated by the mobile device and used to generate the cryptogram, then the payment processor may successfully authenticate the mobile payment.

Figure 9:
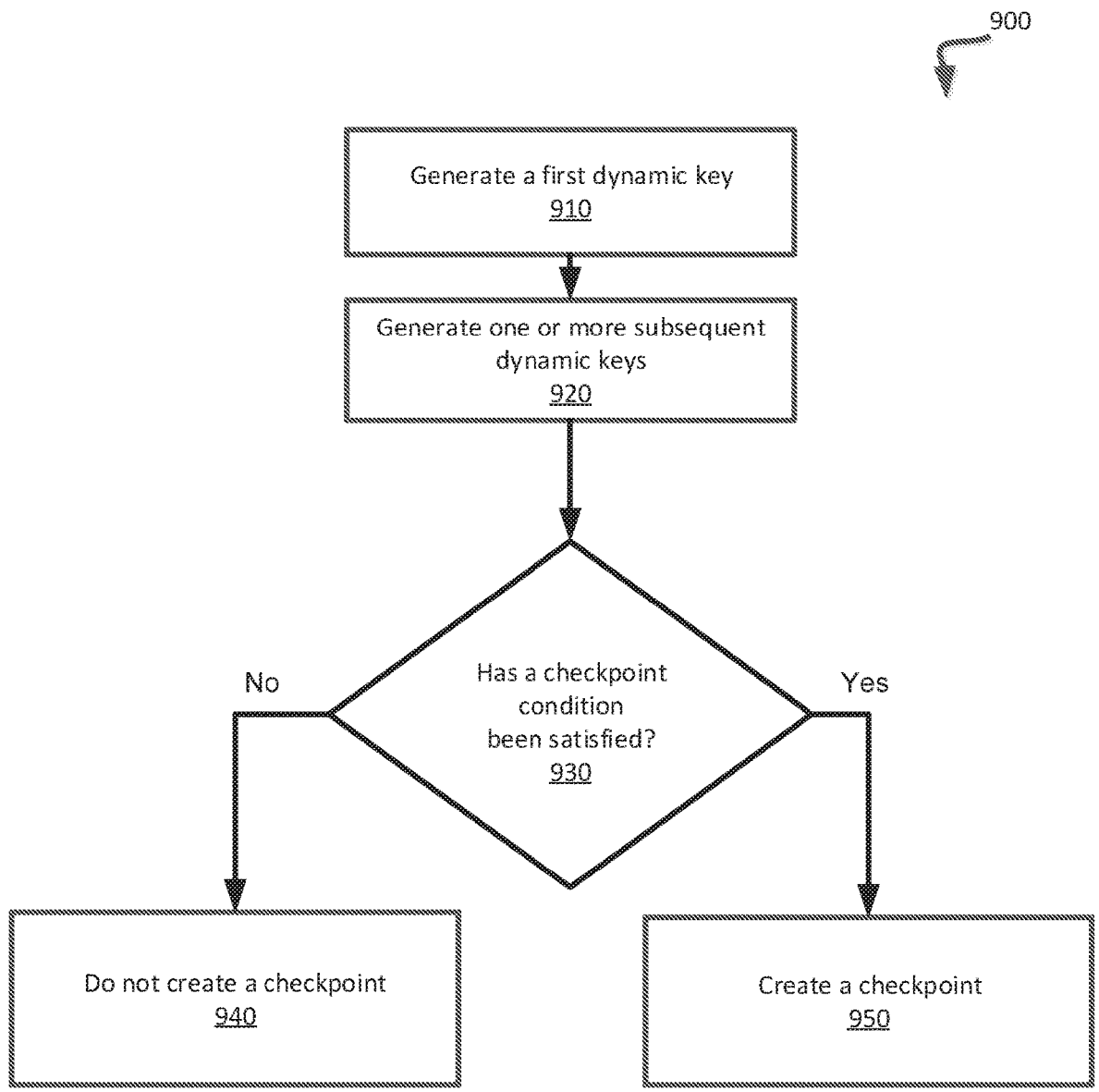
FIG. 9 is a flow diagram of an example method to create a checkpoint associated with mobile payments in which some embodiments of the disclosure may operate.

FIG. 9 is a flow diagram of an example method 900 to create a checkpoint associated with mobile payments in which some embodiments of the disclosure may operate. In general, the method 900 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 900 may be performed by the dynamic key generator 115, 135, or 200 of FIG. 1 or 2.

As shown in FIG. 9, the method 900 may begin with the processing logic generating a first dynamic key (block 910). The first dynamic key may be used to authenticate a first mobile payment as previously described. The processing logic may further generate one or more subsequent dynamic keys (block 920). For example, each of the subsequent dynamic keys may correspond to another mobile payment. The processing logic may further determine if a checkpoint condition has been satisfied (block 930). The checkpoint condition may correspond to a policy associated with mobile payments conducted by a mobile device. Furthermore, a checkpoint may correspond to a state or a particular mobile payment of a series of mobile payments where the mobile payment corresponding to the checkpoint and all previous mobile payments are considered to be successfully authenticated by a payment processor. In some embodiments, a checkpoint condition may correspond to a number of mobile transactions that have been conducted, a total amount spent for a series of mobile payments, or any other condition associated with mobile payments.

Referring to FIG. 9, if the checkpoint condition has not been satisfied, then a checkpoint may not be created (block 940). For example, an additional mobile payment may be conducted and an additional dynamic key may be generated for authenticating the additional mobile payment. However, if the checkpoint condition has been satisfied, then a checkpoint may be created (block 950). For example, if a threshold number of mobile payments has been received (e.g., a defined number of mobile payments since a previous checkpoint has been created) or if a monetary amount spent since a previous checkpoint was generated has exceeded a threshold amount (e.g., an aggregation of one or more mobile payments exceeds the threshold amount), then the checkpoint may be generated for a mobile payment.

As such, a checkpoint may be created where the checkpoint corresponds to a state or a particular mobile payment where the particular mobile payment and other mobile payments since a prior checkpoint have been successfully authenticated.

Figure 10A:
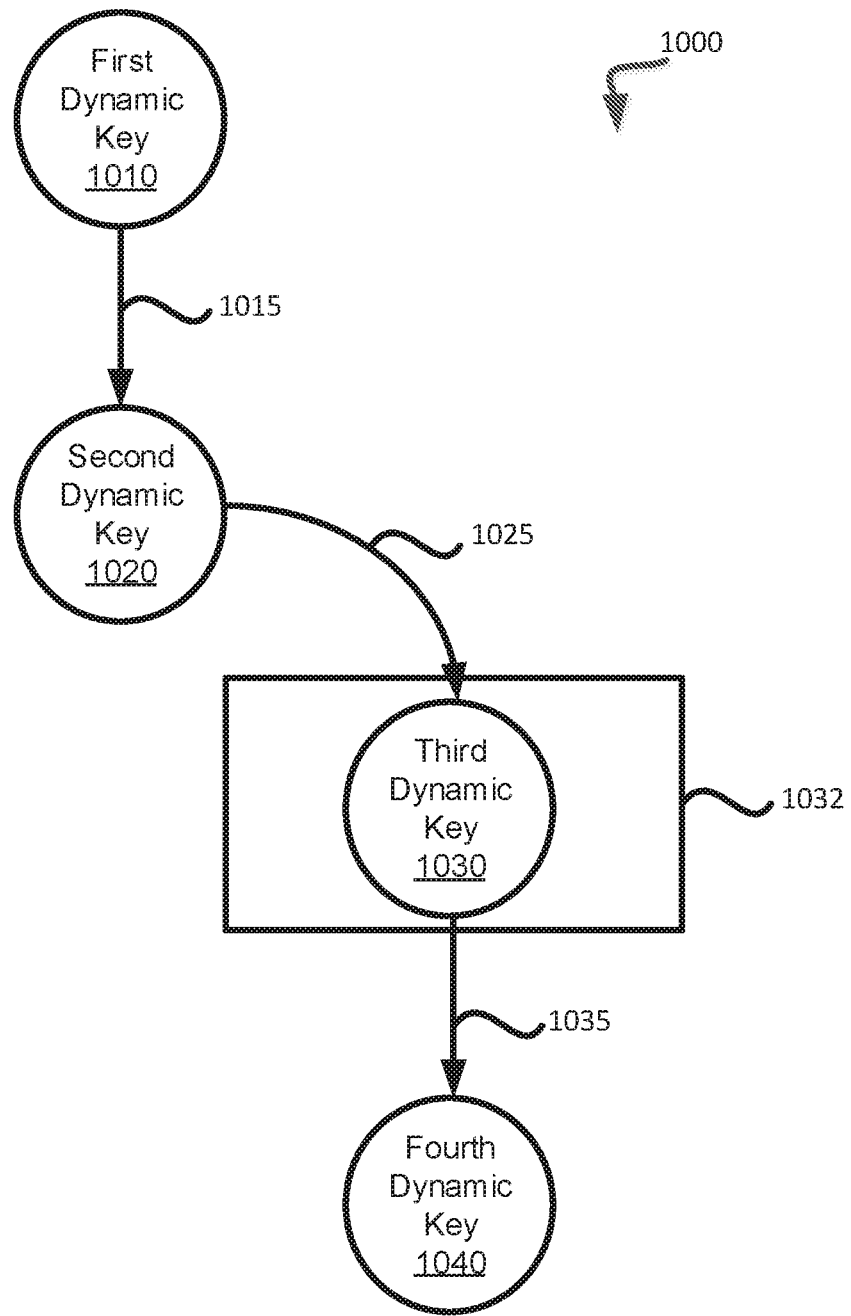
FIG. 10A illustrates a transaction log of mobile payments using a checkpoint in accordance with some embodiments of the present disclosure.

FIG. 10A illustrates a transaction log 1000 of mobile payments using a checkpoint. In general, the transaction log may correspond to mobile payments conducted by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the mobile payments of the transaction log may be performed by the dynamic key generator 115 or 200 of FIG. 1 or 2.

As shown in FIG. 10A, the transaction log may include multiple dynamic keys corresponding to different mobile payments. The transaction log may include multiple entries where each entry corresponds to a different dynamic key associated with a different mobile payment. For example, a first dynamic key 1010 may correspond to a first mobile payment that has been conducted by a mobile device. The first dynamic key 1010 may be used to authenticate the first mobile payment. The first dynamic key 1010 may be updated based on transaction data 1015 of the first mobile payment to generate a second dynamic key 1020 that is used to authenticate a second mobile payment. Similarly, the second dynamic key 1020 may be updated based on the transaction data 1025 of the second mobile payment to generate a third dynamic key 1030. In some embodiments, the third dynamic key 1030 for a third mobile payment may correspond to a checkpoint 1032. For example, a checkpoint may be established after three mobile payments have been conducted. The checkpoint 1032 may represent a state where mobile payments have been authenticated by a payment processor. For example, the checkpoint 1032 may represent a state where the first mobile payment corresponding to the first dynamic key 1010, the second mobile payment corresponding to the second dynamic key 1020, and the third mobile payment corresponding to the third dynamic key 1030 have been successfully authenticated by the payment processor (e.g., in response to cryptograms transmitted from the mobile device). After the checkpoint 1032 has been established, the third dynamic key 1030 may be updated based on transaction data 1035 of the third mobile payment to generate the fourth dynamic key 1040.

Figure 10B:
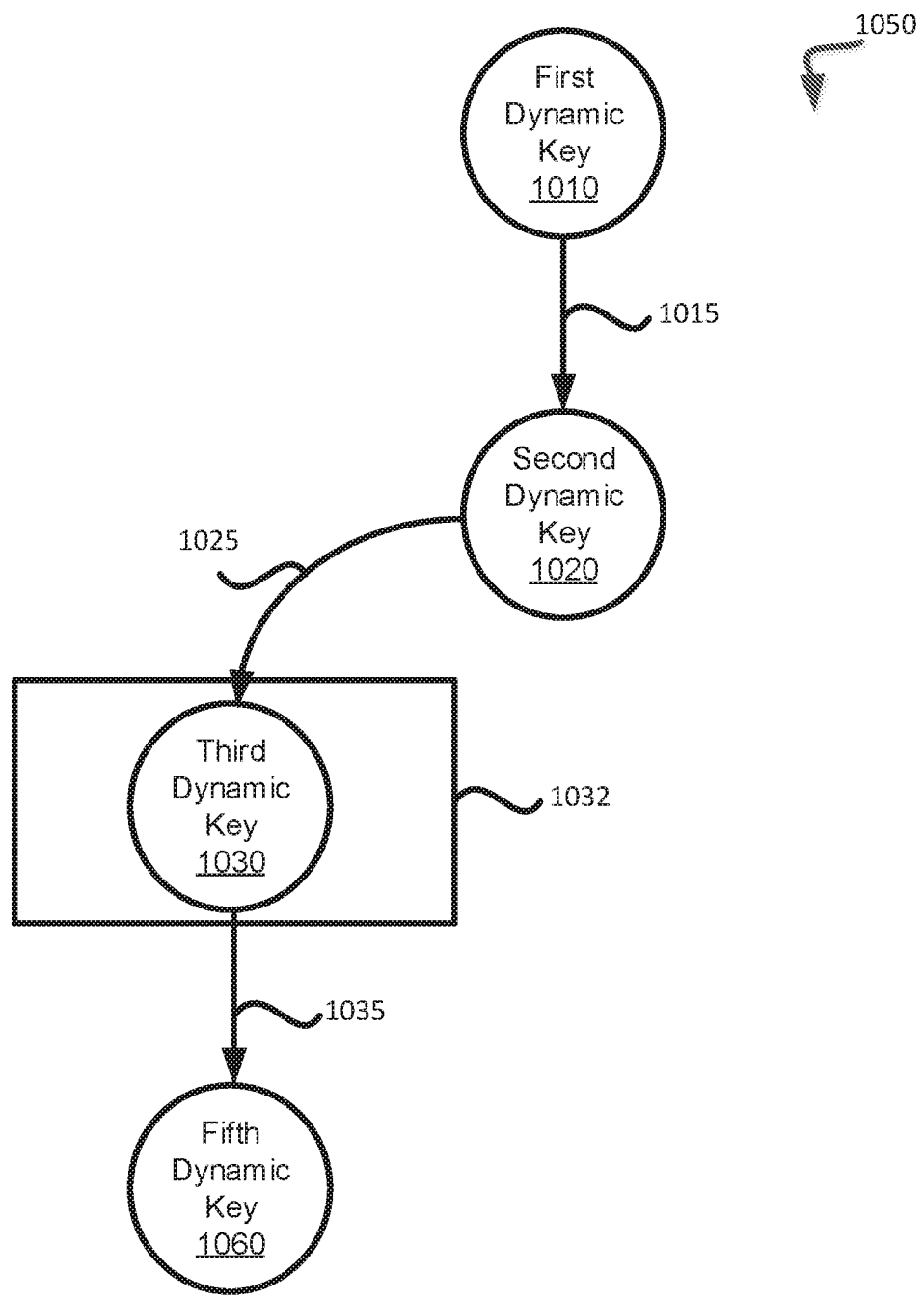
FIG. 10B illustrates the transaction log of mobile payments after a canceled mobile payment in accordance with some embodiments of the present disclosure.

FIG. 10B illustrates the transaction log 1050 of mobile payments after a canceled mobile payment. In general, the transaction log 1050 may correspond to the transaction log 1000 of FIG. 10A after a mobile payment has been canceled and additional mobile payments have been conducted by the mobile device.

As shown in FIG. 10B, a cancellation of the fourth mobile payment corresponding to the fourth dynamic key 1040 may be received. As such, the transaction log 1050 may remove the fourth dynamic key 1040. Subsequently, a fifth dynamic key 1060 may be generated based on transaction data 1035 of the third mobile payment corresponding to the third dynamic key 1030. The fifth dynamic key 1060 may be used to generate a cryptogram for authentication of a fifth mobile payment after the cancellation of the fourth mobile payment and the removal of the fourth dynamic key from the transaction log.

Figure 11:
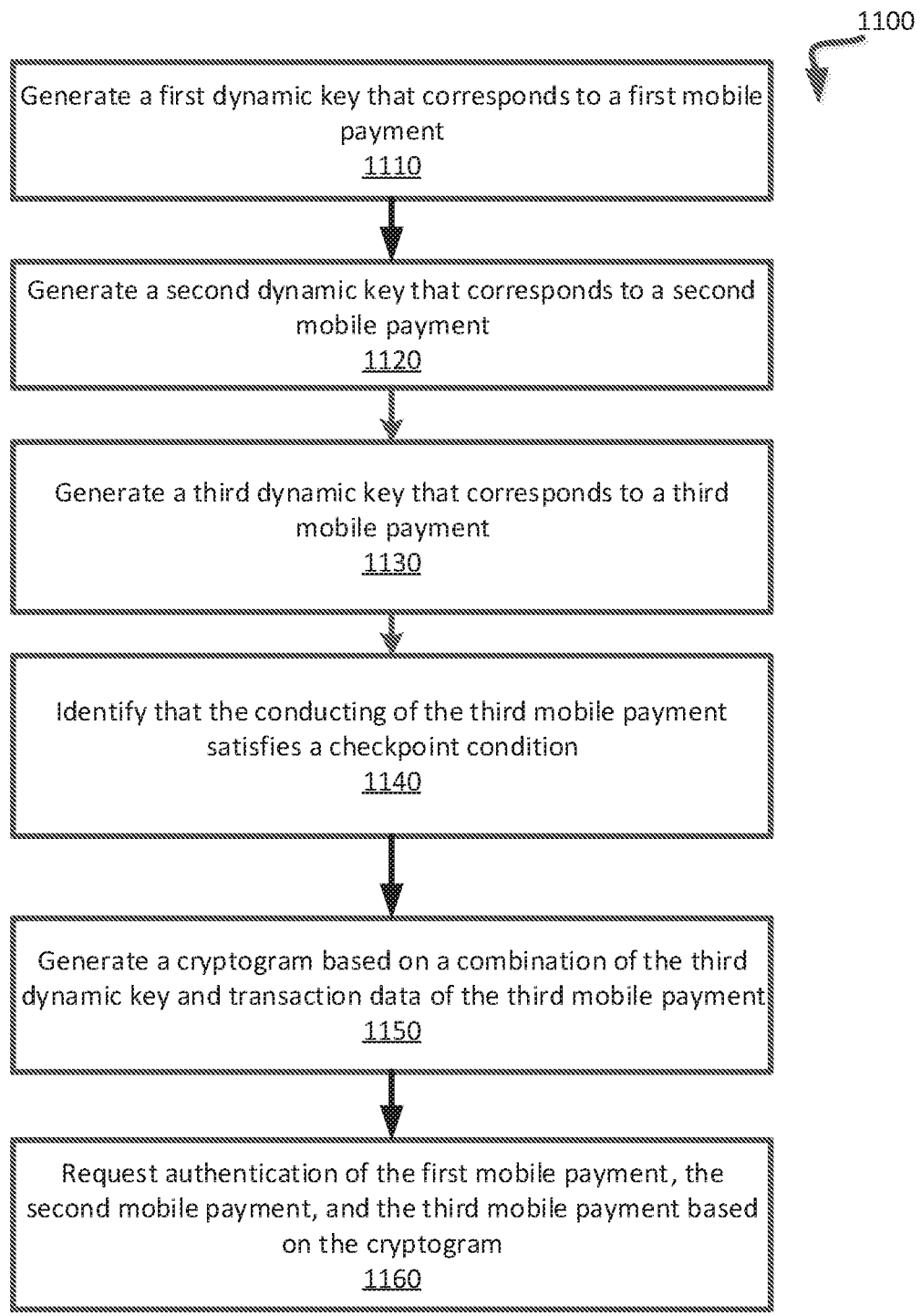
FIG. 11 is a flow diagram of an example method to authenticate multiple mobile payments based on a dynamic key corresponding to a checkpoint in accordance with some embodiments.

FIG. 11 is a flow diagram of an example method 1100 to authenticate multiple mobile payments based on a dynamic key corresponding to a checkpoint. In general, the method 1100 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1100 may be performed by the dynamic key generator 115 or 200 of FIG. 1 or 2.

As shown in FIG. 11, the method 1100 may begin with the processing logic generating a first dynamic key that corresponds to a first mobile payment (block 1110). Subsequently, the processing logic may generate a second dynamic key that corresponds to a second mobile payment (block 1120). Furthermore, the processing logic may generate a third dynamic key that corresponds to a third mobile payment (block 1130). The processing logic may further identify that the third dynamic key that corresponds to the third mobile payment satisfies a checkpoint condition (block 1140). In response to identifying the checkpoint condition, the processing logic may generate a cryptogram based on a combination of the third dynamic key and transaction data of the third mobile payment (block 1150). The processing logic may further request authentication of the first mobile payment, second mobile payment, and the third mobile payment based on the cryptogram (block 1160). For example, the cryptogram that has been generated based on the third dynamic key that corresponds to the third mobile payment may be transmitted from the mobile device to a payment processor (e.g., via a merchant system). If the payment processor successfully authenticates the cryptogram, then the first, second, and third mobile payments may each be considered to be successfully authenticated. However, if the payment processor does not successfully authenticate the cryptogram, then the first, second, and third mobile payments may not be considered to be successfully authenticated. In some embodiments, the successful authentication of the cryptogram may result in the successful authentication of all mobile payments conducted after a previous checkpoint.

As an example, a first checkpoint may correspond to the third mobile payment. A fourth mobile payment, a fifth mobile payment, and a sixth mobile payment may be conducted after the third mobile payment. A second checkpoint may be identified for the sixth mobile payment. In response to identifying the second checkpoint, a second cryptogram may be generated based on a sixth dynamic key that has been generated for the sixth mobile payment. The second cryptogram may be generated based on a combination of the sixth dynamic key and transaction data of the sixth mobile payment. Authentication of the fourth, fifth, and sixth mobile payment may then be requested by using the second cryptogram.

Figure 12:
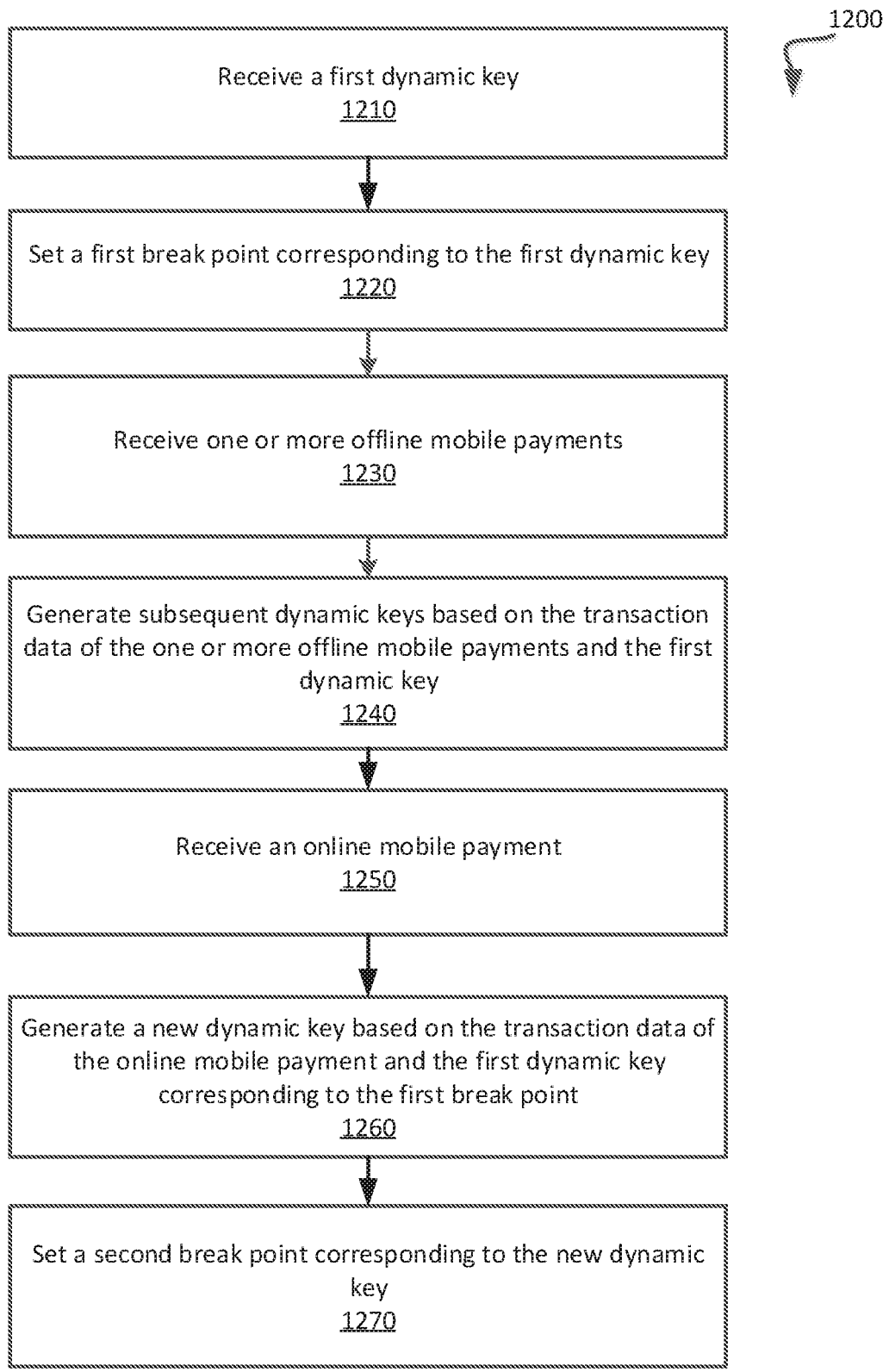
FIG. 12 is a flow diagram of an example method to provide a break point associated with an online mobile payment in accordance with some embodiments.

FIG. 12 is a flow diagram of an example method 1200 to provide a break point associated with an online mobile payment. In general, the method 1200 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1200 may be performed by the dynamic key generator 115 or 200 of FIG. 1 or 2.

A break point may refer to a particular dynamic key that is used to generate subsequent dynamic keys for offline mobile payments or transactions as well as for an online mobile payment or transaction. For example, a break point may designate a particular dynamic key to be used for generating subsequent dynamic keys of offline mobile payments and the same dynamic key designated by the break point may also be used to generate a subsequent dynamic key after an online payment. In some embodiments, an online mobile payment or transaction may correspond to a mobile payment that is to be authenticated at the time when the mobile payment or transaction is conducted (e.g., the cryptogram corresponding to the online mobile payment or transaction is transmitted for authentication) and an offline mobile payment or transaction may correspond to a mobile payment or transaction where the mobile payment is not to be authenticated at the time when the mobile payment or transaction is conducted (e.g., the mobile payment is conducted at a physical terminal and is authenticated at a later time).

As shown in FIG. 12, the method 1200 may begin with the processing logic receiving a first dynamic key (block 1210). The processing logic may further set a first break point corresponding to the first dynamic key (block 1220). For example, the first dynamic key may be identified or set as a dynamic key that corresponds to a break point. The processing logic may receive one or more offline mobile payments (block 1230). In response to the one or more offline mobile payments, the processing logic may generate subsequent dynamic keys based on the transaction data of the one or more offline mobile payments and the first dynamic key (block 1240). For example, the first dynamic key may be updated based on transaction data of a first offline mobile payment to generate a second dynamic key and the second dynamic key may later be updated based on transaction data of a second offline mobile payment to generate a third dynamic key. The processing logic may further receive an online mobile payment (block 1250). For example, the processing logic may receive transaction data corresponding to the online mobile payment that is conducted after the first and second offline mobile payments. The processing logic may generate a new dynamic key based on the transaction data of the online mobile payment and the first dynamic key that corresponds to the first break point (block 1260). For example, the first dynamic key may be retrieved and updated with the transaction data of the online mobile payment to generate a fourth dynamic key. The processing logic may subsequently set a second break point corresponding to the new dynamic key (block 1270). For example, the fourth dynamic key that is generated from an updating of the first dynamic key based on the transaction data of the online mobile payment may be designated as the second break point. In some embodiments, subsequent offline mobile payments may then be based on the new dynamic key corresponding to the second break point and a third break point corresponding to another dynamic key may be designated after another online mobile payment has been conducted.

Thus, a break point may designate a particular dynamic key that is used to generate subsequent dynamic keys for offline mobile payments as well as a subsequent online mobile payment. For example, the same dynamic key is updated based on the transaction data of a first offline payment of a series of offline mobile payments and a value of the same dynamic key is later updated based on transaction data of an online mobile payment after the series of offline mobile payments. A second break point corresponding to a dynamic key that is generated based on updating the particular dynamic key with the transaction data of the online mobile payment may be set. An offline mobile payment that is conducted after the online mobile payment may thus use the dynamic key corresponding to the second break point to generate another dynamic key based on the transaction data of the offline mobile payment conducted after the online mobile payment.

Figure 13:
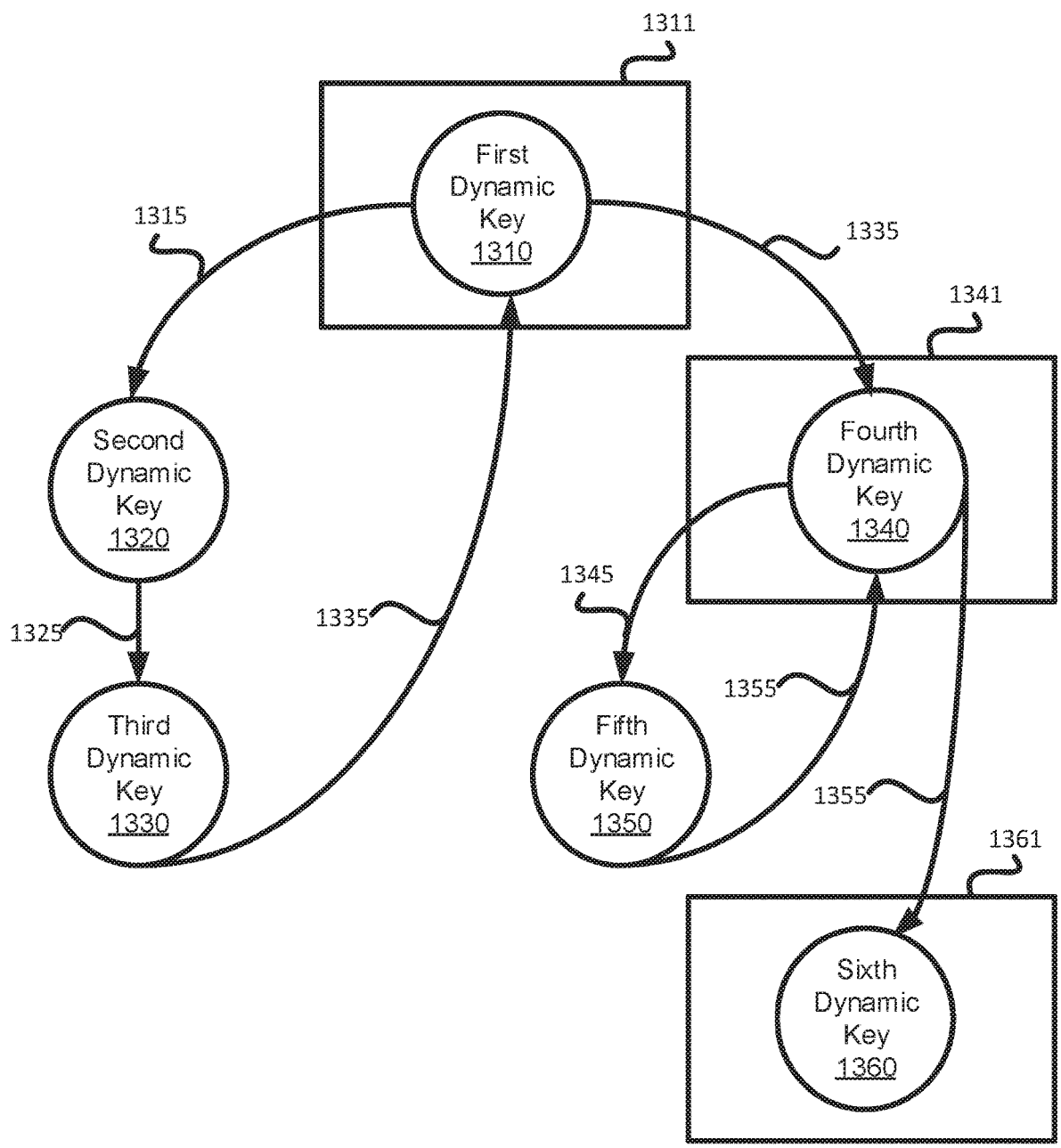
FIG. 13 illustrates the use of a break point for offline mobile payments and online mobile payments in accordance with some embodiments.

FIG. 13 illustrates the use of a break point for offline mobile payments and online mobile payments. In general, the use of a break point may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the use of a break point may be performed by the dynamic key generator 115, 135, or 200 of FIG. 1 or 2.

As shown in FIG. 13, a first dynamic key 1310 may be received. In some embodiments, the first dynamic key 1310 may be the first dynamic key that is generated based on a base key as previously escribed. A first break point 1311 may be set to correspond to the first dynamic key 1310. For example, the value of the first dynamic key 1310 may be saved. A first offline mobile payment may be conducted and its corresponding transaction data 1315 may be used to update the first dynamic key 1310 to generate the second dynamic key 1320. Subsequently, a second offline mobile payment may be conducted and its corresponding transaction data 1325 may be used to update the second dynamic key 1320 to generate the third dynamic key 1330. An online payment may then be conducted and the transaction data 1335 of the online payment may result in the generation of the fourth dynamic key 1340 based on a combination of the saved value of the first dynamic key 1310 that corresponds to the break point 1311 and the transaction data 1335 of the online mobile payment. A second break point 1341 may then be set to correspond to the fourth dynamic key 1340. For example, the value of the fourth dynamic key 1340 may be saved. Furthermore, a third offline mobile payment may be conducted and its corresponding transaction data 1345 may be used to generate the fifth dynamic key 1350 based on the fourth dynamic key 1340 and the transaction data 1345. Another online mobile payment may be conducted and a sixth dynamic key 1360 may then be generated based on the transaction data 1355 of the second online mobile payment and the value of the fourth dynamic key 1340 that was saved by the second break point 1341. A third break point 1361 may then be set corresponding to the sixth dynamic key 1360.

In some embodiments, after the conducting of the online mobile payment and the requesting of authentication of the online payment, the previous offline mobile payments may be authenticated. For example, a cryptogram associated with at least one of the offline mobile payments may be transmitted for authentication of the offline mobile payments in a batch mode (e.g., multiple offline payments being authenticated with the cryptogram). In the same or alternative embodiments, a break point may further be set after a condition associated with the offline mobile payments has been set. For example, a break point may be set after a threshold number of offline mobile payments have been conducted, after a threshold monetary amount has been reached from the offline mobile payments, and so forth. In some embodiments, the break point may be set after a condition associated with the offline mobile payments has been satisfied and/or after the conducting of the online mobile payment.

Figure 14:
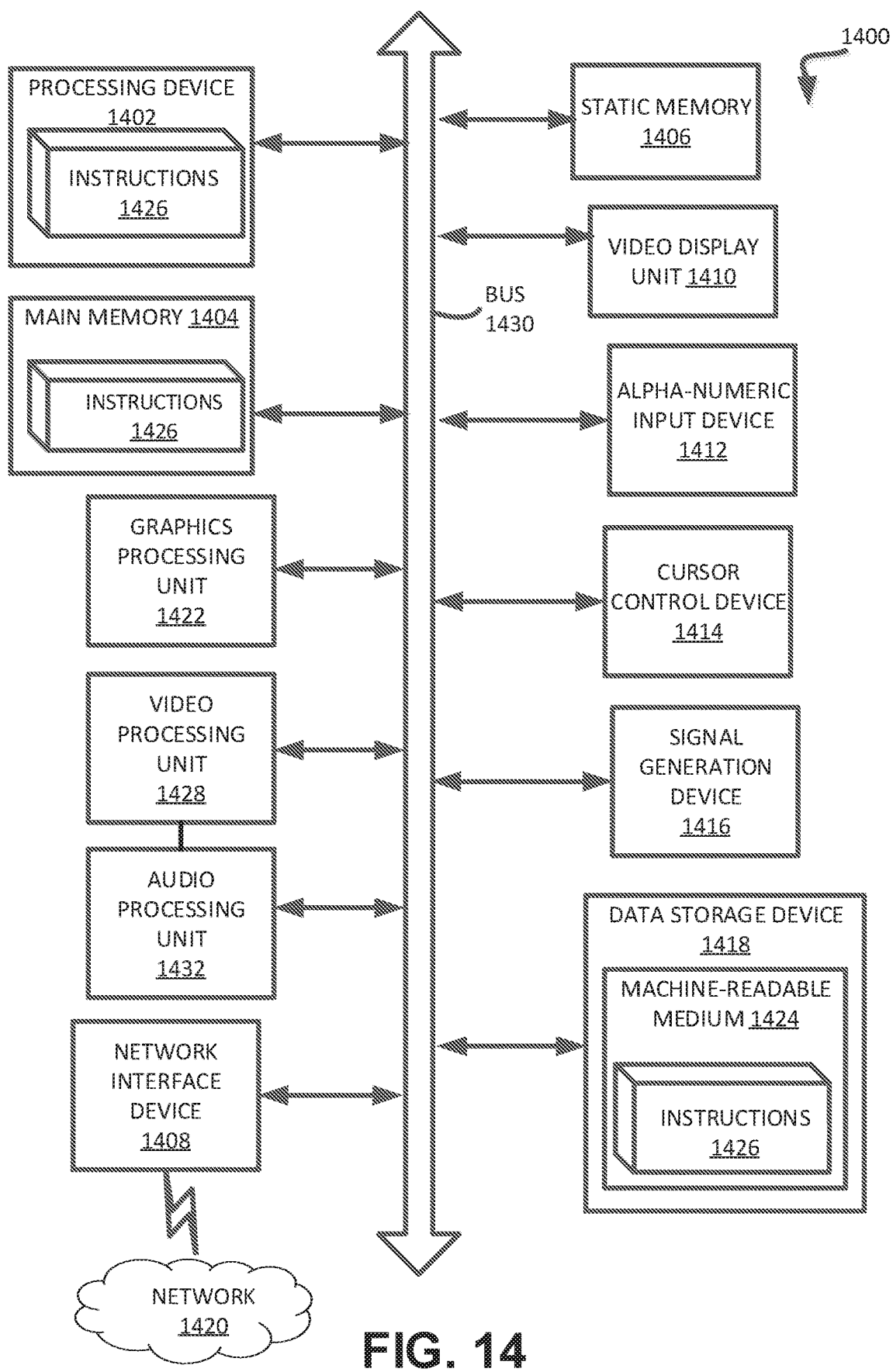
FIG. 14 illustrates a block diagram of an embodiment of a computer system in which some embodiments of the disclosure may operate.

FIG. 14 illustrates an example machine of a computer system 1400 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1400 includes a processing device 1402, a main memory 1404 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a data storage device 1418, which communicate with each other via a bus 1430.

Processing device 1402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1402 may also be one or more special-purpose processing devices such as an application specific integrated circuit (ASIC), a field programmable gate array (FPGA), a digital signal processor (DSP), network processor, or the like. The processing device 1402 is configured to execute instructions 1426 for performing the operations and steps discussed herein.

The computer system 1400 may further include a network interface device 1408 to communicate over the network 1420. The computer system 1400 also may include a video display unit 1410 (e.g., a liquid crystal display (LCD) or a cathode ray tube (CRT)), an alphanumeric input device 1412 (e.g., a keyboard), a cursor control device 1414 (e.g., a mouse), a graphics processing unit 1422, a signal generation device 1416 (e.g., a speaker), graphics processing unit 1422, video processing unit 1428, and audio processing unit 1432.

The data storage device 1418 may include a machine-readable storage medium 1424 (also known as a computer-readable medium) on which is stored one or more sets of instructions or software 1426 embodying any one or more of the methodologies or functions described herein. The instructions 1426 may also reside, completely or at least partially, within the main memory 1404 and/or within the processing device 1402 during execution thereof by the computer system 1400, the main memory 1404 and the processing device 1402 also constituting machine-readable storage media.

In one implementation, the instructions 1426 include instructions to implement functionality corresponding to a dynamic key generator (e.g., dynamic key generator 115, 135, or 200 of FIG. 1 or 2). While the machine-readable storage medium 1424 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
generating, by a processing device of a mobile device, a first dynamic key based on a base key stored in memory of the mobile device, wherein the mobile device is communicatively coupled to a server comprising a payment processor;
receiving, by the processing device, first transaction data corresponding to a first transaction associated with the mobile device;
responsive to generating the first dynamic key, sending a first request associated with the first transaction data to the server to perform a first authentication of the first transaction, wherein requesting the first authentication is based on the first dynamic key;
generating, by the processing device, a second dynamic key based on a combination of the first dynamic key and the first transaction data;
responsive to generating the second dynamic key, generating a cryptogram, by the processing device, using the second dynamic key and second transaction data corresponding to a second transaction; and
sending a second request to the server to perform a second authentication of the second transaction associated with the mobile device by sending the cryptogram to the payment processor.

2. The method of claim 1, wherein the generating of the first dynamic key based on the base key comprises:
receiving an encrypted ephemeral key from the server; and
decrypting the encrypted ephemeral key to create a decrypted ephemeral key based on the base key that is stored at the mobile device, wherein the generating of the first dynamic key is further based on the decrypted ephemeral key.

3. The method of claim 1, wherein the generating of the second dynamic key comprises:
receiving an encrypted ephemeral key from the server; and
decrypting the encrypted ephemeral key to form a decrypted ephemeral key based on the first dynamic key and the first transaction data, wherein the generating of the second dynamic key is further based on the decrypted ephemeral key.

4. The method of claim 1, wherein the first and second transactions are mobile payments, and wherein the second transaction is conducted by the mobile device after conducting of the first transaction.

5. The method of claim 1, further comprising:
in response to the second transaction, updating the second dynamic key to generate a third dynamic key based on a combination of the second dynamic key and the second transaction data corresponding to the second transaction; and
sending a third request to the server to perform a third authentication of a third transaction occurring after the second transaction based on the third dynamic key.

6. The method of claim 1, wherein the generating of the first dynamic key based on the base key comprises:
receiving an ephemeral key from the server, wherein the generating of the first dynamic key is further based on a combination of the ephemeral key with the base key.

7. A system comprising:
a processing device; and
a memory storing instructions that, when executed by the processing device, cause the processing device to:
generate a first dynamic key based on a base key stored in the memory;
receive first transaction data corresponding to a first transaction associated with the processing device, wherein the processing device is communicatively coupled to a server comprising a payment processor;
responsive to generating the first dynamic key, send a first request associated with the first transaction data to the server to perform a first authentication of the first transaction, wherein requesting the first authentication is based on the first dynamic key;
generate a second dynamic key based on a combination of the first dynamic key and the first transaction data;
responsive to generating the second dynamic key, generate a cryptogram using the second dynamic key and second transaction data corresponding to a second transaction; and
send a second request to the server to perform a second authentication of the second transaction associated with the processing device by sending the cryptogram to the payment processor.

8. The system of claim 7, wherein the generating of the first dynamic key based on the base key comprises:
receiving an encrypted ephemeral key from the server; and
decrypting the encrypted ephemeral key to form a decrypted ephemeral key based on the base key that is stored at the processing device, wherein the generating of the first dynamic key is further based on the decrypted ephemeral key.

9. The system of claim 7, wherein the generating of the second dynamic key comprises:
receiving an encrypted ephemeral key from the server; and
decrypting the encrypted ephemeral key to form a decrypted ephemeral key based on the first dynamic key and the first transaction data, wherein the generating of the second dynamic key is further based on the decrypted ephemeral key.

10. The system of claim 7, wherein the processing device is a mobile device; wherein the first and second transactions are mobile payments, and wherein the second transaction is conducted by the mobile device after conducting of the first transaction.

11. The system of claim 7, wherein the processing device is further to:
in response to the second transaction, update the second dynamic key to generate a third dynamic key based on a combination of the second dynamic key and the second transaction data corresponding to the second transaction; and
send a third request to the server to perform a third authentication of a third transaction occurring after the second transaction based on the third dynamic key.

12. The system of claim 7, wherein the generating of the first dynamic key based on the base key comprises:
receiving an ephemeral key from the server, wherein the generating of the first dynamic key is further based on a combination of the ephemeral key with the base key.

13. A non-transitory computer readable medium including data that, when executed by a processing device communicatively coupled to a server comprising a payment processor, cause the processing device to perform operations comprising:
- generating a first dynamic key based on a base key stored in memory;
- receiving first transaction data corresponding to a first transaction associated with the processing device;
- responsive to generating the first dynamic key, sending a first request associated with the first transaction data to the server to perform a first authentication of the first transaction, wherein requesting the first authentication is based on the first dynamic key;
- generating a second dynamic key based on a combination of the first dynamic key and the first transaction data;
- responsive to generating the second dynamic key, generating a cryptogram using the second dynamic key and second transaction data corresponding to a second transaction; and
- sending a second request to the server to perform a second authentication of the second transaction associated with the processing device by sending the cryptogram to the payment processor.

14. The non-transitory computer readable medium of claim 13, wherein the generating of the first dynamic key based on the base key comprises:
- receiving an encrypted ephemeral key from the server; and
- decrypting the encrypted ephemeral key to form a decrypted ephemeral key based on the base key that is stored at the processing device, wherein the generating of the first dynamic key is further based on the decrypted ephemeral key.

15. The non-transitory computer readable medium of claim 13, wherein the generating of the second dynamic key comprises:
- receiving an encrypted ephemeral key from the server; and
- decrypting the encrypted ephemeral key to form a decrypted ephemeral key based on the first dynamic key and the first transaction data, wherein the generating of the second dynamic key is further based on the decrypted ephemeral key.

16. The non-transitory computer readable medium of claim 13, wherein the processing device is a mobile device, wherein the first and second transactions are mobile payments, and wherein the second transaction is conducted by the mobile device after conducting of the first transaction.

17. The non-transitory computer readable medium of claim 13, the operations further comprising:
- in response to the second transaction, updating the second dynamic key to generate a third dynamic key based on a combination of the second dynamic key and the second transaction data corresponding to the second transaction; and
- sending a third request to the server to perform a third authentication of a third transaction occurring after the second transaction based on the third dynamic key.

18. The non-transitory computer readable medium of claim 13, wherein the generating of the first dynamic key based on the base key comprises:
- receiving an ephemeral key from the server, wherein the generating of the first dynamic key is further based on a combination of the ephemeral key with the base key.

* * * * *